Oct. 14, 1969        K. R. BEARD        3,472,303

CAPTIVE SCREW ASSEMBLY

Filed April 22, 1968

INVENTOR.
KENNETH R. BEARD
BY
*William H. Schmeling*

United States Patent Office 3,472,303
Patented Oct. 14, 1969

3,472,303
CAPTIVE SCREW ASSEMBLY
Kenneth R. Beard, Three Rivers, Mich., assignor to Square D Company, Park Ridge, Ill., a corporation of Michigan
Filed Apr. 22, 1968, Ser. No. 722,857
Int. Cl. F16b 43/00, 37/00, 33/02
U.S. Cl. 151—69                 10 Claims

ABSTRACT OF THE DISCLOSURE

An inexpensive assembly for maintaining a screw having a shank portion captive in a metal panel such as a door without separate retainers wherein the panel has a thickness greater than the width of the threads of the screw and includes an elongated unthreaded opening wherein the screw is received with the opening having a width less than the major diameter of the threads of the screw and indentations in the side walls of the opening provide clearance when the screw is installed in the opening.

---

The present invention relates to fastening means and more particularly to an assembly involving a threaded fastening element which is maintained captive without assistance from other devices in an unthreaded opening in a panel.

The use of screws to retain metal covers on receptacles and doors closed in structures such as control centers is well known and frequently captive type screw arrangements are employed to prevent loss of the screws when the covers are removed or the doors are opened. In the captive screw assembly according to the present invention the screws are maintained captive in an opening in a panel having a thickness greater than the thread width of the screw entirely by the material of the panel without requiring special devices such as washers or threaded openings in the panel as are commonly employed.

It is an object of the present invention to provide an inexpensive captive screw assembly wherein the screw is held captive in an opening in a panel without requiring special retaining devices or threaded openings in the panel and wherein the screw is movable in the panel to compensate for misalignments between the opening in the panel wherein the screw is received and a threaded fastener which receives the screw.

Another object is to provide an inexpensive captive screw assembly that includes an elongated opening in a panel having a thickness greater than the thread width of the screw and wherein the elongated opening has a length greater than a major diameter of the threads and a width less than the major diameter and greater than the minor diameter of the threads of the screw and to provide the panel with indentations at portions of the side walls of the opening to reduce the panel thickness at the side wall portions to a predetermined dimension to eliminate interference with the screw threads when the screw is installed in the opening.

An additional object is to provide an inexpensive assembly for maintaining a shank portion of a screw captive in an elongated opening in a metal panel that has a thickness greater than the thread thickness of the screw and wherein the elongated opening has a length greater than the major diameter of the threads and a width along a diameter through a central portion of the opening between a pair of opposed side walls of the opening equal to the pitch diameter of the threads and an indentation in each of the opposed side walls centered on the central diameter of the opening and extending into the material of the panel to a depth to provide clearance between the metal material of the panel adjacent the side walls and portions of the flank of the threads disposed between the pitch diameter and the major diameter of the screw when the screw is threaded into the opening.

Further objects and features of the invention will be readily apparent to those skilled in the art from the specification and appended drawing illustrating certain preferred embodiments in which.

For purposes of illustration, and to aid in the understanding of the present invention, the terms as hereinafter used to describe parts of a captive screw as used in accordance with the present invention are in conformity with the definitions extracted from American Standards Unified Screw Threads (AS B1.1–1960 with permission of the publisher, the American Society of Mechanical Engineers.

Figure 5:
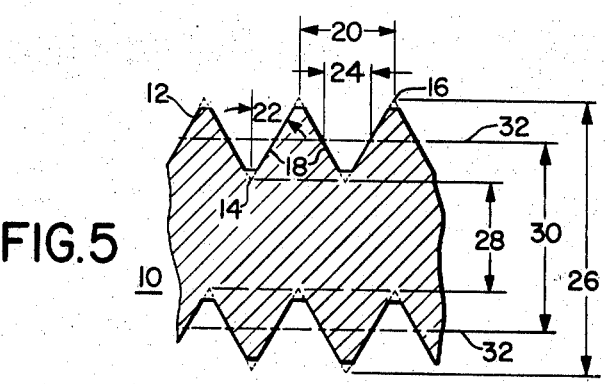
FIG. 5 is a view illustrating the terms adopted by the American Society of Mechanical Engineers to define portions of screws.

While the retaining means according to the present invention may be used with screws other than the type herein illustrated, referring to FIG. 5, a portion of a screw 10 having threads 12 is shown. Each thread 12 has a root 14, a crest 16 and a flank 18, which are defined as: The root of a thread is that surface of the thread which joins the flanks of adjacent thread forms and is identical with or immediately adjacent to the cylinder from which the thread projects; the crest of a thread is that surface of the thread which joins the flanks of the thread and is farthest from the cylinder from which the thread projects; the flank of a thread is either surface connecting the crest with the root, the intersection of which, with an axial plane, is theoretically a straight line. Additionally, the pitch of a thread is the distance measured parallel to its axis, between corresponding points on adjacent thread forms in the same axial plane and on the same side of the axis, and is designated by the dimension 20 in FIG. 5. The flank angles, shown as 22, are the angles between the individual flanks and are perpendicular to the axis of the thread measured in an axial plane. The thickness of the threads, shown by dimension 24, is the distance between the flanks of the thread measured at a specified position and parallel to the axis. The major diameter, illustrated by numeral 26, is the diameter of a coaxial cylinder which would bound the crests of an external thread, and the minor diameter, shown as 28, is the diameter of a coaxial cylinder which would bound the roots of an external thread. The pitch diameter, defined as the diameter of a coaxial cylinder, the surface of which would pass through the thread profiles at such points as to make the width of the groove equal to one half of the basic pitch, is illustrated by the numeral 30 and is generated by the pitch line 32, which is defined as a generator of the cylinder specified in the definition of the pitch diameter.

While the arrangement according to the present invention has other uses, as will be readily apparent, it is particularly suited to secure a door of a control center as disclosed in an application for United States patent, Ser. No. 689,538, filed Dec. 11, 1967, which is assigned by the inventors Edward J. Stark et al. to the assignee of the present invention. The means for fastening the door, a portion of which is illustrated as a panel 34, includes a screw 10 and an elongated opening 36 in the panel 34, as will be hereinafter described.

The screw 10 has a thread including threads 12 at one end and a head portion 38 at its opposite end. A shank portion 40 which is disposed between the head portion 38 and the threads 12 of the screw 10 has an external diameter not greater than the minor diameter 28 of the threads 12. The head portion 38 has an external diameter greater than the major diameter 26 of the threads 12.

Figure 1:
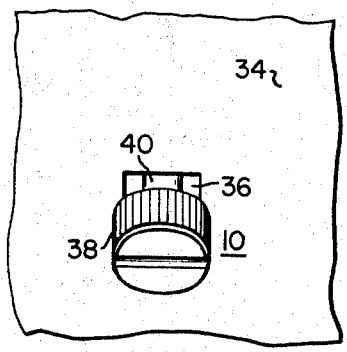
FIG. 1 is a front plan view of a screw held captive in an opening in a metal panel according to the present invention.
Figure 2:
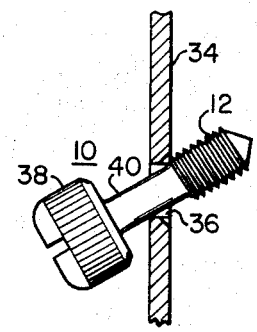
FIG. 2 is a side view partly in section showing the screw and the panel in FIG. 1.
Figure 4:
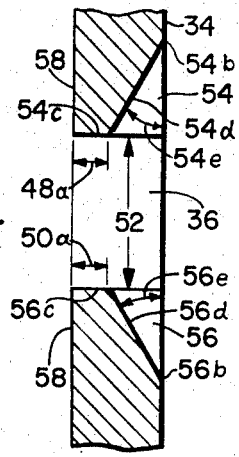
FIG. 4 is a cross sectional view along line 4—4 in FIG. 3.
Figure 3:
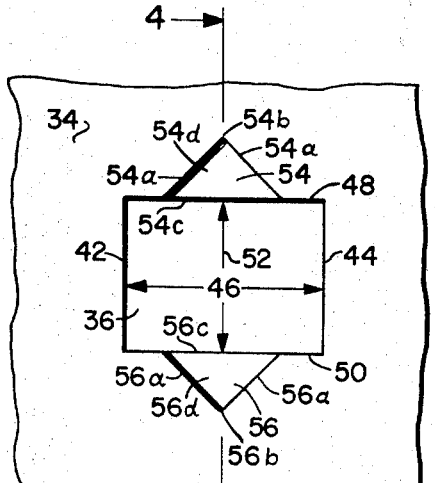
FIG. 3 is an enlarged rear view of the opening in the panel in FIG. 1.

The panel 34 has a thickness greater than the thread thickness 24 of the screw 10 is thus formed so the panel 34 may possess the required rigidity to serve as a door for a cabinet and be secured with inexpensive hardware exemplified by the screw 10. The elongated opening 36, as most clearly illustrated in FIGS. 3 and 4, is rectangular in shape, although as will be apparent, the opening 36 may be formed as an oval, if desired. The opening 36 has end walls 42 and 44 which are spaced from each other by a distance larger than the major diameter 26 as indicated by the dimension line 46 and a pair of side walls 48 and 50. The spacing between the side walls 48 and 50, as defined by a diameter 52, that extends through a central portion of the opening 36 and perpendicular to the side walls 48 and 50, is preferably equal to the pitch diameter 30 of the threads 12 although, as will be apparent, the spacing between the side walls may be less or greater than the pitch diameter.

Centered on the diameter 52 and extending outwardly of the side walls 48 and 50 are indentations or recesses 54 and 56. The indentations preferably are formed by the same tool that is used to punch the opening 36 in the panel 34 and are triangular in shape although other shaped indentations, such as semieclipsed indentations, may be used. The triangular shaped indentations 54 and 56 respectively have walls 54a and 56a extending vertically in the material of the panel 34 and converging at an apex 54b and 56b with the respective base 54c and 56c of the triangularly shaped indentations 54 and 56 extending in the side walls 48 and 50. Extending from the bases 54c and 56c to the respective apexes 54b and 56b are walls 54d and 56d which are inclined at an angle respectively designated as 54e and 56e relative to the front flat face of the panel 34. The indentations 54 and 56 are formed in the material of the panel 34 to provide the portion of the side walls 48 and 50 wherein the bases 54c and 56c are located with a thickness respectively designated by the numerals 48a and 50a which preferably equals the thickness of the threads 24 which is preferably defined by the pitch diameter 30 and an angle if incline 54e and 56e that is less than the flank angle 22.

During assembly of the screw 10 in the opening 36, the screw 10 is inclined at an angle relative to and perpendicular to the panel 34 through the opening 36 so the wall portions 48a and 50a are received in the thread 12. It will be seen that as the distance between the walls 48a and 50a is equal to or greater than the pitch diameter 30 and the thickness of the walls 48a and 50a is equal or less than the thread thickness 24, the threading of the screw 10 into the opening 36 may be accomplished without interference as the angles 54e and 56e of the inclined walls 54d and 56d is less than the flank angle 22. The shank portion 40 of the screw 10 will be received in the opening 36 when all of the threads 12 have been rotated past the walls 48a and 50a and passed over the inclined walls 54d and 56d. The diameter of the shank 40 is equal to or less than the minor diameter 28. Thus as the distance between the walls 48a and 50a is greater than the minor diameter 28, the shank 40 will be loosely received in the opening 36 and the screw 10 may be readily aligned with an internally threaded fastener, not shown, in spite of misalignments which may be present. As previously stated, the head portion 38 of the screw 10 has a diameter equal to or greater than the major diameter 26. Thus the shank 40 is held captive in the opening 36 as the outer diameters of both the head portion 38 and the threads 12 are greater than the diameter 52.

In addition to eliminating the threading operation to form a threaded opening to maintain a screw captive, a practice which is conventionally followed, the elongated shape of the opening 36 permits a locking structure to be used to prevent manipulation of the screw by unauthorized persons in a manner disclosed in a United States application for patent, Ser. No. 723,352, concurrently filed herewith and assigned by the inventors Kenneth R. Beard and Richard C. Rothweiler to the assignee of the present invention.

While certain preferred embodiments of the invention have been specifically disclosed, it is understood that the invention is not limited thereto, as many variations will be readily apparent to those skilled in the art and the invention is to be given its broadest possible interpretation.

What is claimed is:

1. A captive screw assembly comprising: an axially extending screw having a head and threads at its opposite ends and a shank between the head and threads, said threads having crests and roots respectively defining a major diameter and a minor diameter of predetermined size, flanks having a predetermined angle, said shank portion having a diameter equal or less than the minor diameter and said head having a diameter at least equal to the major diameter, a rigid metal plate having an elongated opening receiving the screw, said plate having a thickness between a front and a rear surface greater than the distance between the crests of adjacent threads measured along a line parallel to the axis of the screw, the thickness of the thread on said screw being the distance between the flanks of the thread measured at a diameter intermediate the major and the minor diameters parallel to the axis of the screw, and said elongated opening being defined by side walls extending perpendicular to the front and rear surfaces of the plate and having a length measured between a first pair of opposed side wall portions greater than the major diameter and having a width measured between a second pair of opposed side wall portions equal to the diameter defining the thread thickness, the opposed side wall portions of said second-mentioned pair of side wall portions being disposed in spaced parallel planes, and a pair of recesses in one face of the plate, said recesses being centrally disposed with respect to the first-mentioned pair of opposed side wall portions and being respectively disposed on opposite sides of said opening and in open communication therewith and being of a depth which reduces the thickness of the plate between the bottoms of the recesses and the unrecessed face of the plate to a dimension not greater than the distance between the flanks of the threads at a point disposed between the diameter defining the thread thickness and the major diameter, each of said recesses having a bottom wall intersecting respectively the second pair of opposed side wall portions of said opening, the bottom wall portions of the respective recesses being formed and arranged so that said lines of intersection between said bottom walls and said opposed side walls are coplanar and parallel to each other and parallel to the unrecessed face of the plate, said lines of intersection defining a pair of opposed screw-engaging edge portions spaced apart a distance equal to the diameter defining the thread thickness of the screw when a screw is threaded into the opening.

2. The captive screw assembly in accordance with claim 1 wherein the bottom walls of said recesses are each defined by a perimeter having a straight line portion and the bottom walls are so disposed that the straight line portions of said perimeters coincide respectively with the lines of intersection between said bottom walls and said opposed wall portions respectively.

3. The captive screw assembly in accordance with claim 1 wherein the bottom walls of said recesses are of triangular shape and are disposed so that the bases of said triangular shapes coincide respectively with the lines of intersection between said bottom walls and said opposed side walls respectively.

4. The captive screw assembly in accordance with claim 1 wherein the threads have a predetermined pitch diameter and the dimension determining the width of the opening is the pitch diameter of the threads.

5. The captive screw assembly in accordance with claim 1 wherein the bottom walls of the recesses are inclined and extend at an angle from a flat surface of the plate with the angle of incline of the inclined wall being less than the flank angle of the threads to provide the clearance between the flank portions of the thread and the material of the plate when the screw is threaded into the opening.

6. The captive screw assembly in accordance with claim 1 wherein the pair of recesses each have a base portion extending in one of the opposed side walls of the opening and portions remote from the base portion spaced on opposite sides of the opening at a distance greater than the major diameter.

7. The captive screw assembly in accordance with claim 1 wherein the recesses provide the central diameter portions of the opposed side walls of the opening with a thickness equal to or less than the thread thickness.

8. The captive screw assembly in accordance with claim 1 wherein the opening has a rectangular shape and the recesses each have a trianguler shape.

9. The captive screw assembly in accordance with claim 1 wherein the opening has a rectangular shape, the bottom walls of the recesses are of triangular shape and are disposed so that the bases of said triangular shapes coincide respectively with the lines of intersection between said bottom walls and said opposed side walls respectively whereby the screw-engaging edge portions are straight lines and the threads have a predetermined pitch diameter and the dimension determining the width of the opening is the pitch diameter of the threads.

10. The captive screw assembly in accordance with claim 9 wherein the bottom walls of said recesses are inclined and extend at an angle from a flat surface of the plate with the angle of incline of the bottom wall of the recesses being less than the flank angle of the threads to provide the clearance between the flank portions of the thread and the recessed portions of the plate when the screw is threaded into the opening.

References Cited

UNITED STATES PATENTS 1,028,859   6/1912   Bulland.
3,373,645   3/1968   Holton.

FOREIGN PATENTS 157,520   7/1954   Australia.

EDWARD C. ALLEN, Primary Examiner

U.S. Cl. X.R.

85—32, 46

PO-1050
(5/69)

UNITED STATES PATENT OFFICE
CERTIFICATE OF CORRECTION

Patent No. 3,472,303                    Dated October 14, 1969

Inventor(s)    Kenneth R. Beard

It is certified that error appears in the above-identified patent and that said Letters Patent are hereby corrected as shown below:

Column 2, line 24, cancel "(AS B1.1-1960" and insert --(ASA B1.1-1960)--; line 45, cancel "are" and insert --the--; line 72, after "thread" insert --portion--. Column 3, line 46, cancel "if" and insert --of--; line 49, cancel "and" and insert --a--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents